United States Patent [19]

Ahn

[11] Patent Number: 5,531,004

[45] Date of Patent: Jul. 2, 1996

[54] MACHINING CENTER HAVING A ROTARY DOOR OPENABLE BY AN AUTOMATIC PALLET CHANGER

[75] Inventor: Jae B. Ahn, Changwon, Rep. of Korea

[73] Assignee: Daewoo Heavy Industries Ltd., Incheon, Rep. of Korea

[21] Appl. No.: 365,625

[22] Filed: Dec. 28, 1994

[30] Foreign Application Priority Data

Dec. 28, 1993 [KR] Rep. of Korea ............... 93-30395

[51] Int. Cl.$^6$ ............................. B23Q 7/00
[52] U.S. Cl. ............................. 29/33 P; 29/DIG. 56; 29/DIG. 59; 409/134; 74/608
[58] Field of Search ............... 29/33 P, DIG. 60, 29/DIG. 86, DIG. 59, DIG. 94, DIG. 56; 409/134; 160/29; 74/608; 198/950, 465.1, 346.1; 451/451, 252; 483/3, 2

[56] References Cited

U.S. PATENT DOCUMENTS

| | | | |
|---|---|---|---|
| 4,863,319 | 9/1989 | Winkler et al. | 29/DIG. 56 X |
| 4,999,895 | 3/1991 | Hirose et al. | 29/33 P |
| 5,181,898 | 1/1993 | Piotrowski | 483/3 |
| 5,265,497 | 11/1993 | Curless | 74/608 |
| 5,487,414 | 1/1996 | Hayashi | 29/DIG. 56 |

Primary Examiner—William Briggs
Attorney, Agent, or Firm—Lowe, Price, LeBlanc & Becker

[57] ABSTRACT

A machining center adapted for use in cutting a workpiece into a desired shape, comprising: a bed having a table for changeably holding a first pallet; a support die disposed in front of the bed to support a second pallet to be changed with the first pallet; a machine housing extending upwardly from the bed to define a cutting compartment enclosing the first pallet, the machine housing having a frontal access opening; a rotary door mounted on the machine housing to openably close the access opening; pivot pins for pivotally supporting the rotary door at central top and bottom edges of the door; a pallet changer disposed beneath the rotary door for exchanging the first and second pallets with each other, the pallet changer including a rotary arm, a vertical cylinder for causing the arm to vertically move from a lower position to an upper position and first and second horizontal cylinders for causing the arm to rotate between a first angular position where the arm remains parallel to the door and a second angular position where the arm becomes perpendicular to the door; and locator pins and locator holes for allowing the rotary arm to engage with the rotary door as the rotary arm moves into the upper position at the second angular position.

7 Claims, 4 Drawing Sheets

MACHINING CENTER HAVING A ROTARY DOOR OPENABLE BY AN AUTOMATIC PALLET CHANGER

FIELD OF THE INVENTION

The present invention pertains generally to a machining center and, more particularly, to a horizontal machining center which has a rotary door pivotally mounted in front of a cutting compartment and openable by an automatic pallet changer lying underneath the rotary door.

DESCRIPTION OF THE PRIOR ART

Most of state-of-the-art machining centers make use of an automatic pallet changer, often referred to as "APC" by its acronym, which can exchange a pair of workpiece supporting pallets between a rest position and a cutting position each time the cutting operation for one workpiece comes to an end. The cutting operation is carried out within a cutting compartment surrounded by a machine housing which has an access opening in front thereof. A door is openably mounted on the machine housing to close off the access opening, thereby inhibiting chips or cutting fluid from coming out of the cutting compartment in the workpiece cutting process.

To change the pair of pallets each located at the rest position and the cutting position, the first step in the prior art machining center is to open the door, after which the automatic pallet changer will cause the pallets to be exchanged with each other by way of performing a given number of pallet changing substeps. The last step is to close the door to physically isolate the cutting compartment. Opening and closing the door in the manner as noted above is however highly cumbersome and time-consuming to perform. Moreover, a specially designed door operating device has to be provided in order to open and close the door on a pallet changing time basis, which would lead to an increased complexity of the machining center and would eventually make the machining center costly. The desirability of providing a readily openable door in the machining center is the premise on which the invention was made.

SUMMARY OF THE INVENTION

Accordingly, it is an object of the invention to provide a machining center that can eliminate the drawbacks inherent in the prior art machining center as referred to above and further that can enable a door to be open and closed in synchronism with pallet changing operation and without resort to a separate door operating equipment.

With the above object in view, the present invention provides a machining center adapted for use in cutting a workpiece into a desired shape, comprising: a bed having a table for changeably holding a first pallet; a support die disposed in front of the bed to support a second pallet to be changed with the first pallet; a machine housing extending upwardly from the bed to define a cutting compartment enclosing the first pallet, the machine housing having a frontal access opening; a rotary door mounted on the machine housing to openably close the access opening; mean for pivotally supporting the rotary door at central top and bottom edges of the door; a pallet changer disposed beneath the rotary door for exchanging the first and second pallets with each other, the pallet changer including a rotary arm, means for causing the arm to vertically move from a lower position to an upper position and means for causing the arm to rotate between a first angular position where the arm remains parallel to the door and a second angular position where the arm becomes perpendicular to the door; and mean for allowing the rotary arm to engage with the rotary door as the rotary arm moves into the upper position at the second angular position.

BRIEF DESCRIPTION OF THE DRAWINGS

Other objects, features and advantages of the invention will become apparent from the following description of the preferred embodiment taken in conjunction with the accompanying drawings in which.

DETAILED DESCRIPTION OF THE PREFERRED EMBODIMENT

Figure 1:
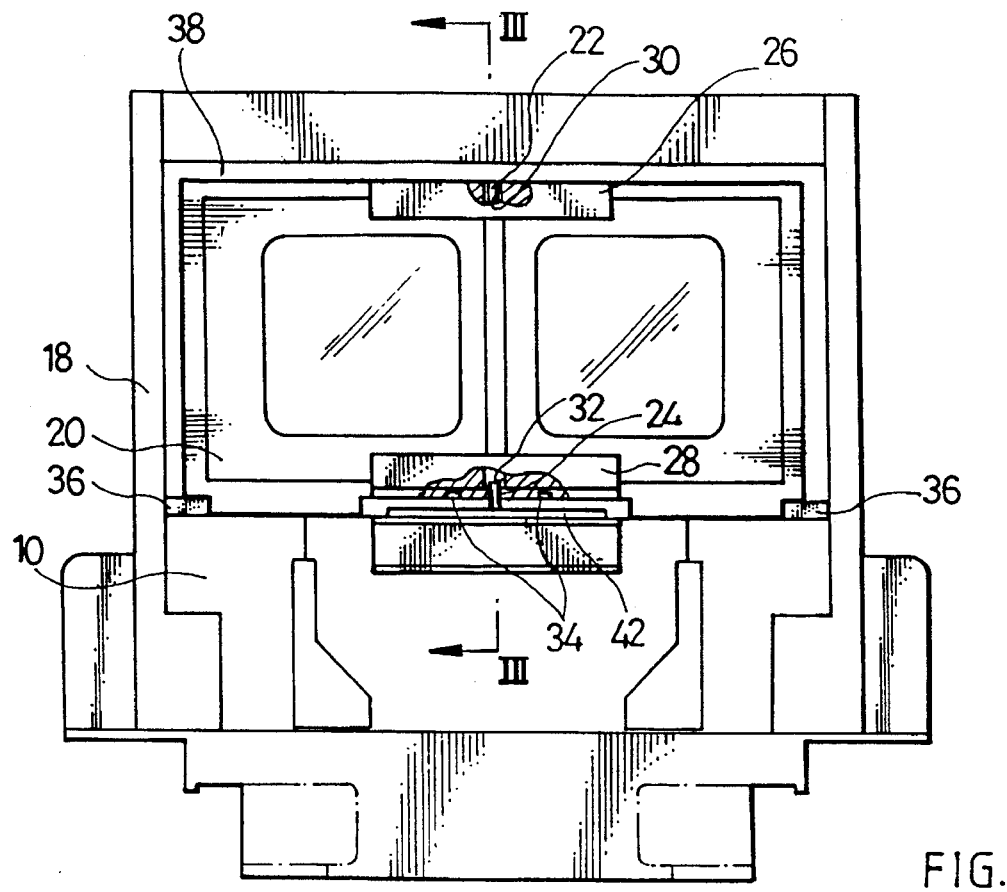
FIG. 1 is a front elevational view showing the machining center in accordance with the invention.
Figure 2:
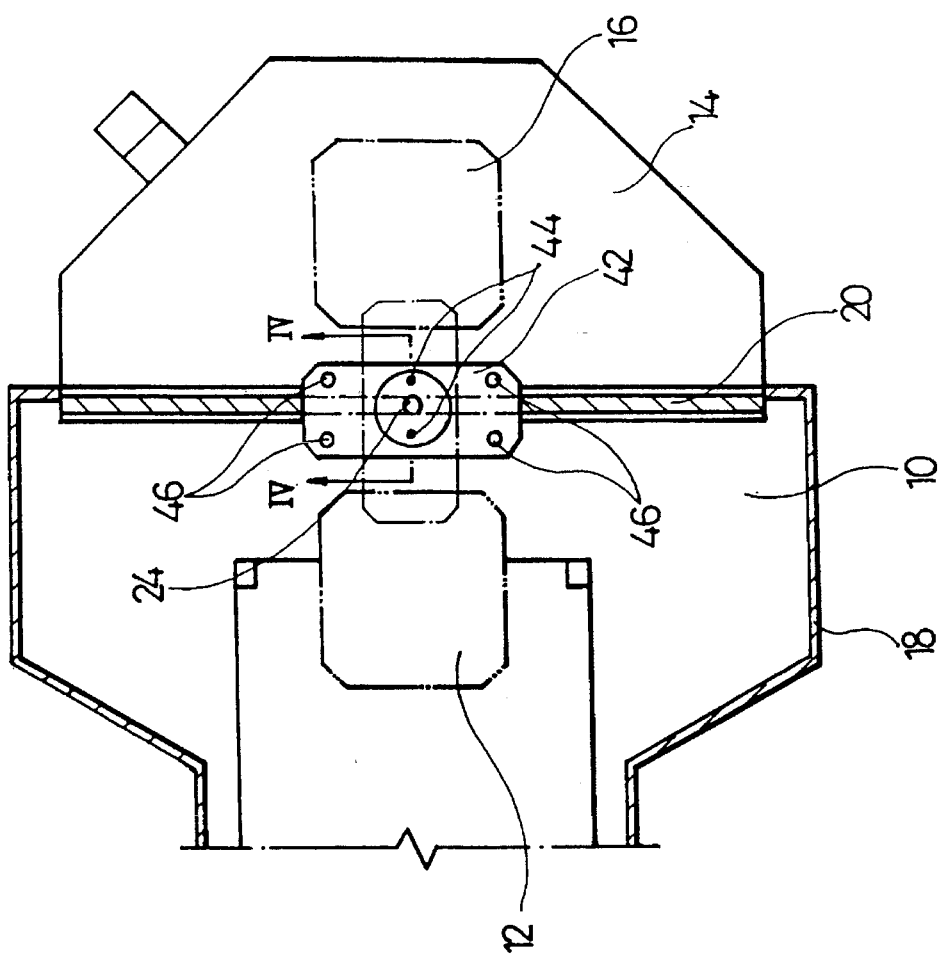
FIG. 2 is a top view of the machining center as shown in FIG. 1, with portions thereof removed for the sake of simplicity.

Referring now to FIGS. 1 and 2, there is shown a horizontal machining center adapted for use in cutting a workpiece into a desired shape. The machining center comprises, but is not limited to, a bed 10 that holds a first pallet 12 on its table in a readily changeable fashion and a support die 14 disposed in front of the bed 10 to support a second pallet 16 to be changed with the first pallet 12. The first pallet 12 assists in supporting a workpiece at a cutting position, while the second pallet 16 serves to support the workpiece at a rest position. A machine housing 18 extends upwardly from the bed 10 to define a cutting compartment which encloses the first pallet 12. The machine housing 18 has a frontal access opening that provides access to the first pallet 12 and the workpiece lying thereon.

Figure 3:
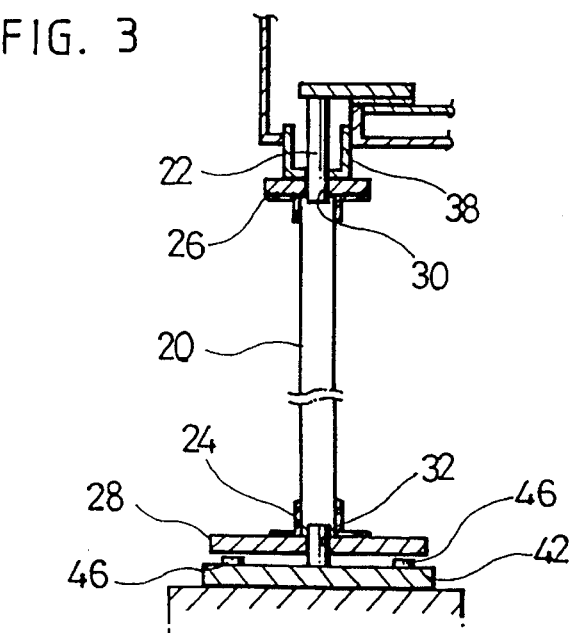
FIG. 3 is a sectional view taken along line III—III in FIG. 1, illustrating the rotary door in greater detail.

As best shown in FIGS. 2 and 3, a rotary door 20 is mounted on the machine housing 18 to openably close the access opening. The rotary door 20 is pivotally supported at its top and bottom central edges by means of an upper pivot pin 22 which projects downwardly from the ceiling of the machine housing 18 toward the central top edge of the rotary door 20 and a lower pivot pin 24 which protrudes upwardly toward the central bottom edge of the rotary door 20 from a pallet changer set forth below.

In the illustrated embodiment, the rotary door 20 may preferably be provided with a top reinforcing flange 26 and a bottom reinforcing flange 28. The top flange 26 has an upper pivot hole 30 to receive the upper pivot pin 22 therethrough, with the bottom flange 28 having a lower pivot hole 32 to accommodate the lower pivot pin 24. On the bottom flange 28 of the rotary door 20, there are provided a pair of spaced apart locator holes 34 as is apparent in FIG. 1. Unlike in the illustrated embodiment, the number of the locator holes 34 may either be reduced to one or increased to more than two, since it is a matter of design choice.

Additionally, in the vicinity of the rightward and leftward bottom corners of the access opening of the machine housing 18, a pair of generally U-shaped guide brackets or pins 36 extend a short distance upwardly from the bed over lateral bottom edges of the rotary door 20, as depicted in FIG. 1, to hold the door 20 in place. A sliding cover 38 may be slidably mounted on the machine housing 18 in a permanent contact relationship with the top flange 26 of the rotary door 20, to eliminate the gap present between the machine housing 18 and the rotary door 20.

Figure 4:
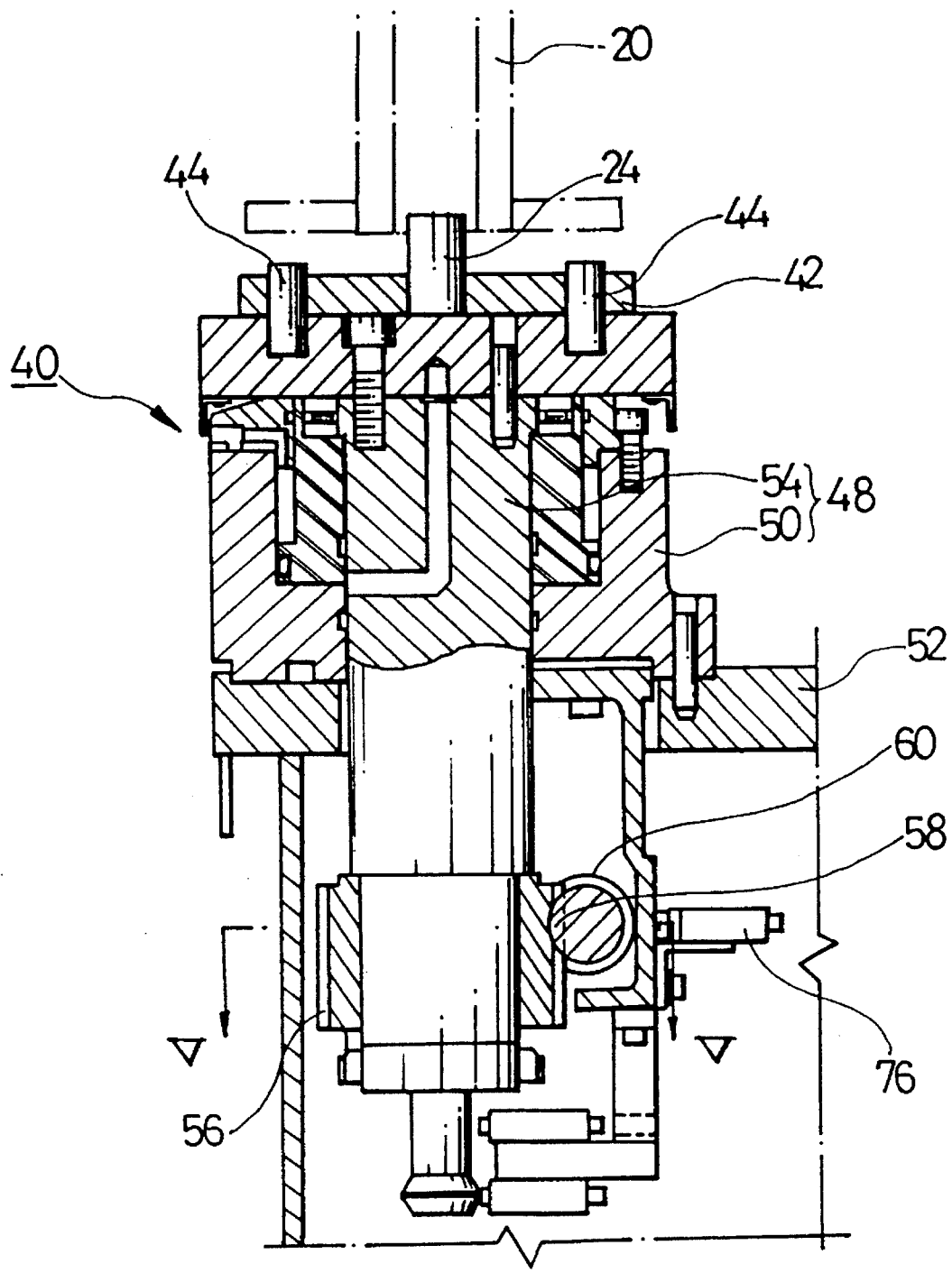
FIG. 4 is a sectional view taken along line IV—IV in FIG. 2, showing the pallet changer in detail.

Referring further to FIG. 4 in combination with FIGS. 1 through 3, it can be seen that a pallet changer 40 is disposed beneath the rotary door 20 to exchange the first and second pallets 12, 16 with each other in an automatically controlled manner. The pallet changer 40 includes a rotary arm 42 from which the lower pivot pin 24 mentioned above projects upwardly into the lower pivot hole 32. The rotary arm 42 has at least one, preferably, a pair of locator pins 44 protruding upwardly therefrom. The locator pins 44 is spaced apart from the lower pivot pin 24 in the transverse direction of the rotary arm 42 as best shown in FIG. 2. The locator pins 44 can engage with the locator holes 34 as the rotary arm 42 is caused to move upward as in the manner described below. The rotary arm 42 is further provided with four of latch pins 46 which may come into engagement with the corresponding latch holes (not shown) formed on the underside of the respective pallets 12 and 16.

As clearly depicted in FIG. 4, the rotary arm 42 may be caused to move up and down between a lower position and an upper position spaced a predetermined distance from the lower position. The vertical up/down movement of the rotary arm 42 is carried out by means of a vertical cylinder 48 which includes a cylinder housing 50 fixedly secured to the bed 10 through a frame 52 and a piston 54 extendibly fitted through the cylinder housing 50. The piston 54 has a top end attached to the rotary arm 42 and a bottom end located below the cylinder housing 50. When the piston 54 is fully extended from the cylinder housing 50, the rotary door 20 will be somewhat lifted up from the bed 10 to assure that the lateral bottom edges thereof can be withdrawn out of the guide brackets 36 shown in FIG. 1. In this regard, the height of the guide brackets 36 should be less than the predetermined distance between the lower and upper positions of the rotary arm 42.

Figure 5:
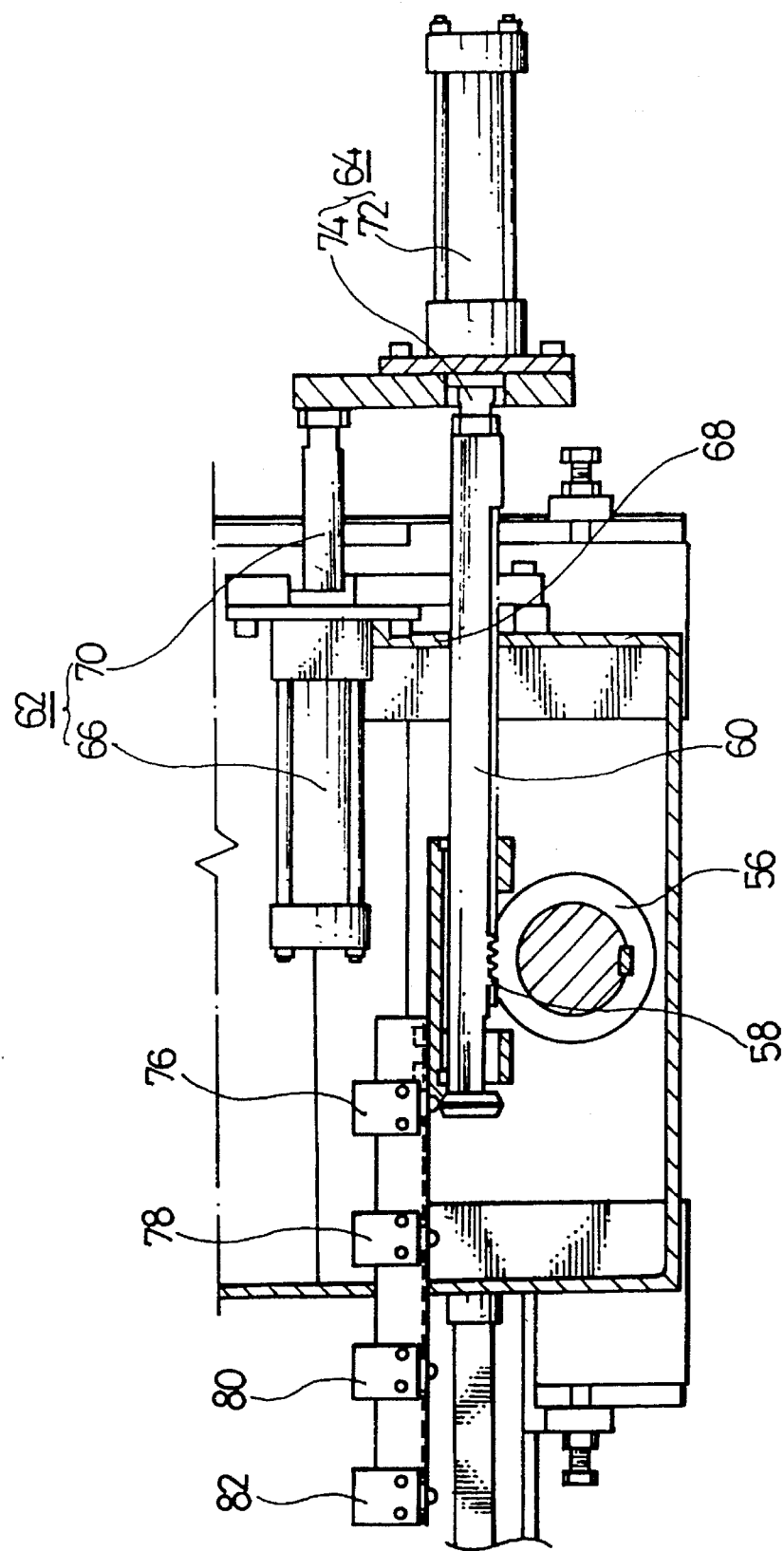
FIG. 5 is a sectional view taken along line V—V in FIG. 4.

Moreover, the rotary arm 42 may be caused to rotate between a first angular position, indicated in solid line in FIG. 2, where the arm 42 remains parallel to the rotary door 20 and a second angular position, indicated in phantom line in FIG. 2, where the arm 14 becomes perpendicular to the rotary door 20 to engage with the first and second pallets 12, 16. To effectuate rotation of the rotary arm 42, a pinion gear 56 is carried at the second end of the piston 54 of the vertical cylinder 48. Meshing with the pinion gear 56 is a rack 58 which extends along the length of a reciprocating rod 60, as clearly shown in FIG. 5.

A first horizontal cylinder 62 and a second horizontal cylinder 64 are used in causing linear movement of the reciprocating rod 60 to thereby rotatably drive the pinion gear 56 and hence the piston 54. The first horizontal cylinder 62 includes a cylinder housing 66 fixedly secured to the bed 10 by virtue of a frame 68 and a piston rod 70 slidably fitted into the cylinder housing 66. Likewise, the second horizontal cylinder 64 is provided with a cylinder housing 72 which in turn is carried by the piston rod 70 of the first horizontal cylinder 62 and a piston rod 74 which is extendibly fitted into the cylinder housing 72. The piston rod 74 of the second horizontal cylinder 64 is connected to the reciprocating rod 60. The position of the reciprocating rod 60 may be detected by means of first to fourth limit switches 76, 78, 80, 82 which are electrically associated with a pallet changer controller(not shown).

The rotary door 20 set forth above can be opened and closed by the pallet changer 40 in the following manner. To enable the first and second pallets 12, 16 to be changed with each other, the first horizontal cylinder 62 is actuated to make the piston rod 70 retract from the initial extended position, thus advancing the reciprocating rod to the second limit switch 78. In response, the piston 54 and the rotary arm 42 are caused to rotate counterclockwise 90 degree into the second angular position as shown in phantom line in FIG. 2. Each of the pallets 12, 16 is unlocked as the rotary arm 42 is subjected to such rotation by the first horizontal cylinder 62.

Subsequently, the vertical cylinder 48 is actuated to cause the rotary arm 42 to move upwardly into the upper position. This assures that the latch pins 46 of the rotary arm 42 come into engagement with the corresponding latch holes of the first and second pallets 12, 16. Concurrently, the locator pins 44 of the rotary arm 42 are engaged with the locator holes 34 of the rotary door 20. As the rotary arm 42 moves upward in this way, the rotary door 20 is lifted somewhat from the bed 10 so that the lateral bottom edges of the door 20 can be completely withdrawn from the guide brackets 36. This will bring the door 20 into a freely rotatable state about the upper and lower pivot pins 22, 24. Under that state, the second horizontal cylinder 64 is actuated to advance the reciprocating rod to the fourth limit switch 82. Accordingly, the rotary arm 42 is caused to rotate counterclockwise 180 degree together with the rotary door 20, which rotation makes the first and second pallets 12, 16 changed with each other.

The vertical cylinder 48 is then retracted to bring the rotary arm 20 into the lower position out of engagement with the rotary door 20 and the pallets 12, 16. As a subsequent step, the first horizontal cylinder 62 is extended to cause the rotary arm 42 to rotate clockwise 90 degree. The final step is to have the second horizontal cylinder 64 retract, consequently causing the rotary arm 42 to rotate clockwise 180 degree into the initial position. This means that the rotary door 20 is subjected to a 180 degree rotation about the upper and lower pivot pins 22, 24 each time when the pallet changing operation takes place.

While the invention has been shown and described with reference to a preferred embodiment, it should be apparent to those skilled in the art that many changes and modifications may be made without departing from the spirit and scope of the invention as defined in the claims.

What is claimed is:

1. A machining center adapted for use in cutting a workpiece into a desired shape, comprising:

a bed having a table for changeably holding a first pallet;

a support die disposed in front of the bed to support a second pallet to be changed with the first pallet;

a machine housing extending upwardly from the bed to define a cutting compartment enclosing the first pallet, the machine housing having a frontal access opening;

a rotary door mounted on the machine housing to openably close the access opening;

means for pivotally supporting the rotary door at central top and bottom edges of the door;

a pallet changer disposed beneath the rotary door for exchanging the first and second pallets with each other, the pallet changer including a rotary arm, means for causing the arm to vertically move from a lower position to an upper position and means for causing the arm to rotate between a first angular position where the arm remains parallel to the door and a second angular position where the arm becomes perpendicular to the door; and means for allowing the rotary arm to engage with the rotary door as the rotary arm moves into the upper position at the second angular position.

2. The machining center as recited in claim 1, wherein the means for pivotally supporting the rotary door includes an upper pivot pin projecting downwardly from the machine housing toward the central top edge of the door and a lower pivot pin extending upwardly from the rotary arm toward the central bottom edge of the door.

3. The machining center as recited in claim 2, wherein the rotary door is provided with a top reinforcing flange and a bottom reinforcing flange, the top flange having an upper pivot hole to receive the upper pivot pin therethrough, the bottom flange having a lower pivot hole to receive the lower pivot pin therethrough.

4. The machining center as recited in claim 3, wherein the means for allowing the rotary arm to engage with the rotary door includes at least one locator pin protruding upwardly from the rotary arm and spaced apart from the lower pivot pin in a transverse direction of the rotary arm and at least one locator hole formed on the bottom reinforcing flange of the rotary door to receive the locator pin.

5. The machining center as recited in claim 1, further comprising a pair of generally U-shaped guide brackets extending upwardly from the bed over lateral bottom edges of the rotary door, the height of the respective guide bracket being less than the distance between the upper and lower position of the rotary arm, and a sliding cover slidably fitted to the machine housing in a permanent contact relationship with the top reinforcing flange of the rotary door.

6. The machining center as recited in claim 1, wherein the means for causing the arm to vertically move comprises a vertical cylinder including a cylinder housing fixedly secured to the bed and a piston extendibly fitted through the cylinder housing, the piston having a first end attached to the rotary arm and a second end located below the cylinder housing.

7. The machining center as recited in claim 6, wherein the means for causing the arm to rotate comprises: a pinion gear provided at the second end of the vertical cylinder; a reciprocating rod having a rack meshing with the pinion gear; a first horizontal cylinder having a cylinder housing fixedly secured to the bed and a piston rod extendibly fitted into the cylinder housing of the first horizontal cylinder; and a second horizontal cylinder having a cylinder housing carried by the piston rod of the first horizontal cylinder and a piston rod extendibly fitted into the cylinder housing of the second horizontal cylinder, the piston rod of the second horizontal cylinder connected to the reciprocating rod.

* * * * *